Figure 1:
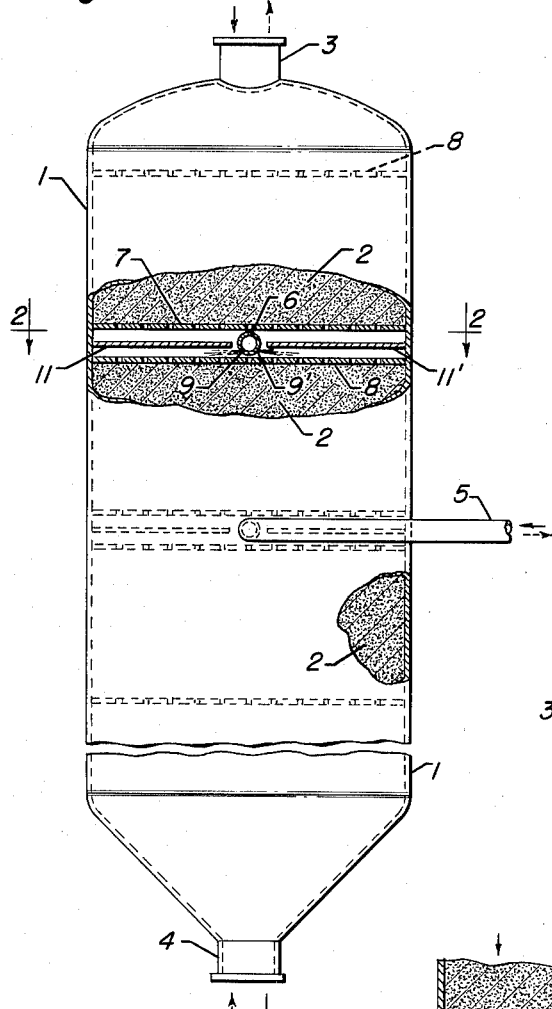

Oct. 26, 1965   D. B. BROUGHTON   3,214,247
FLUID DISTRIBUTING MEANS FOR PACKED CHAMBERS
Filed Feb. 25, 1963

Downward Fluid Flow

Upward Fluid Flow

INVENTOR:
Donald B. Broughton

BY: James R. Hoatson Jr.
Philip T. Liggett
ATTORNEYS

United States Patent Office 3,214,247
Patented Oct. 26, 1965

3,214,247
FLUID DISTRIBUTING MEANS FOR PACKED CHAMBERS
Donald B. Broughton, Chicago, Ill., assignor to Universal Oil Products Company, Des Plaines, Ill., a corporation of Delaware
Filed Feb. 25, 1963, Ser. No. 260,506
4 Claims. (Cl. 23—288)

This invention relates to fluid distributing means for packed chambers and more specifically to the combination of perforate distributor pipe means and a baffle plate arrangement which is adapted for use in a fluid-solids contacting chamber to improve mixing of fluid feed stream and uniformity of flow through the contact beds.

It is not unusual to effect the redistribution of fluid streams through packed columns by providing multiple beds and perforate plate means for redistributing moving streams. Also, it is generally customary to provide spray or nozzle means for introducing a fluid stream into an intermediate point of a packed column. However, the usual arrangements do not provide for good rapid mixing of an additive stream with the fluid moving through the column, nor do the conventional constructions and arrangements preclude convective mixing or back-mixing of liquids into an upstream portion of the chamber.

It is thus a principal object of the present invention to provide an improved fluid distributing system for packed chamber which effects a lateral jet stream type of discharge and mixing of an added fluid into the restricted flow path of a fluid stream being collected and redistributed between superimposed packed sections of the contact chamber.

It is a further object of the invention to provide an improved fluid distributing system for use between packed sections of a fluid-solids contacting column which provides for the special placement of fluid discharge perforations in a distributor pipe means and for the special positioning of fluid baffle plates in combination therewith.

In a broad embodiment, the present invention provides a liquid distributing means for use between packed sections of a fluid-solids contacting chamber which comprises in combination, perforated distributor pipe means adapted to extend laterally into the unpacked space between packed sections of the chamber, with the perforations of said pipe means positioned in a substantially uniformly spaced opposing two-row arrangement, whereby multiple stream fluid distribution is jetted generally laterally therefrom in opposing directions, and substantially horizontal baffle means extends in substantially the same horizontal plane as the axis of said pipe means at an intermediate level between packed sections of the chamber, said baffle means having slotted open portions to allow room for the pipe means and to provide on each side thereof narrow fluid passageways along each of the longitudinal edges of said pipe means, whereby a fluid stream passing generally vertically through said contacting chamber will be channeled through the slotted portions of said baffle means along each side of said pipe means and into the paths of the fluid streams which may be jetted from said pipe means.

The present fluid distributing apparatus arrangement is suitable for any packed column using catalyst particles, inert particles, or adsorptive material and having one or more intermediate fluid streams being brought into contact with a fluid stream moving upwardly or downwardly through the column. Still further, the distributing system is particularly useful in connection with columns having a multiplicity of beds and a multiplicity of inlet points, or a combination of inlet and outlet points, by reason of a compact shallow construction effecting a savings in column height as well as for controlled flow and mixing efficiency. For example, the fluid distributing system of the present invention may be used advantageously in connection with a chamber having a multiplicity of separate fixed sorptive beds and operating in a continuous manner by moving the inlet and outlets with respect to the beds. For this type of operation, reference is made to Patent No. 2,985,589 of D. B. Broughton and C. G. Gerhold, issued May 23, 1961. Adsorbents used in a process of this type may comprise silica gel, activated charcoal, aluminum silicates, such as various clays, synthetically prepared composites of alumina and silica, activated alumina and molecular sieves which may consist of a dehydrated calcium aluminum silicate hydrate.

From the aspect of good design and engineering, it may be noted that the following requirements are essential to the good operation of a multiple bed packed chamber having intermediate feed distribution points with respect to superimposed spaced beds of molecular sieves or other contact material: (a) a minimum volume of liquid in the distributor pipe in order to minimize the volume of a flush stream which may be required; (b) the preclusion of high velocity jet streams impinging on an adsorbent material in order to avoid attrition; (c) the channeling of the liquid flow through the column into a path adjacent the distributor pipe means in order to obtain uniform mixing of the intermediate feed streams with the liquid flowing through the column; (d) the unpacked volume in the chamber minimized in order to reduce convective mixing; and (e) high velocity flow through the unpacked sections in order to prevent backmixing, with constrictions in each unpacked section providing velocities sufficiently high to prevent convective mixing of liquid on the downstream side with liquid on the upstream side.

Reference to the accompanying drawing and the further following description thereof will serve to point out and amplify the advantageous features of the improved fluid distributing system and the ability to satisfy the requirements of the above enumerated points providing optimum operation of a fluid-solids contacting unit.

FIGURE 1 of the drawing is an elevational view, partially in section, indicating a packed chamber having a plurality of superimposed contact beds with intermediate fluid distributing points.

Figure 2:
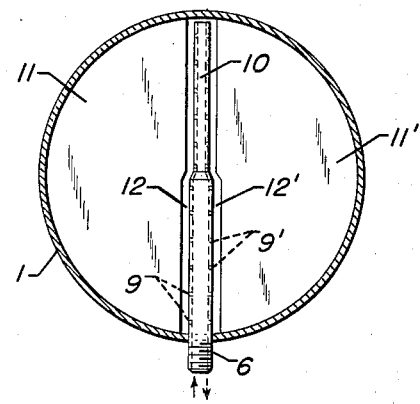

FIGURE 2 of the drawing is a sectional plan view through one form of fluid distributing arrangement, as indicated by the line 2—2 in FIGURE 1 of the drawing.

Figure 3:
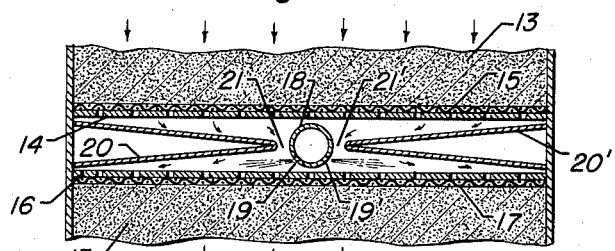

FIGURE 3 of the drawing is a partial sectional elevational view, indicating a downward fluid flow through the packed column and a modified form of baffle plate construction.

Figure 4:
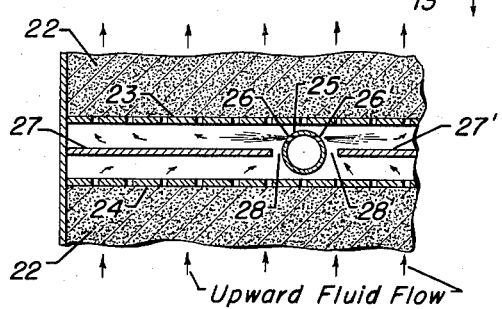

FIGURE 4 of the drawing shows another partial sectional elevational view indicating distributor pipe means with perforations in the upper one half portion thereof to accommodate an upward fluid flow through the column.

Figure 5:
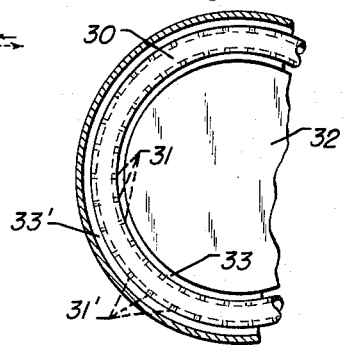

FIGURE 5 of the drawing illustrates the use of a circular distributor pipe and a concentric baffle plate means.

Referring now particularly to FIGURES 1 and 2 of the drawing, there is shown diagrammatically a vertically positioned confined chamber 1 adapted to hold a plurality of vertically spaced superimposed contact beds 2 which are to be contacted with two or more fluid streams. The particulated material comprising the beds 2 may comprise an inert material such as quartz chips, an active catalyst in the form of pellets, spheres, etc., or alternatively, such material may comprise a sorptive type of particle such as silica gel, activated charcoal, molecular sieves, and the like, as described hereinbefore. In other words, it is not intended to limit the present improved construction and the fluid-solids contacting chamber to the use of any one type of material or compound for the packed zones therein. One fluid stream may be introduced to the upper portion of chamber 1 by way of inlet port 3 while a combined or treated fluid stream may be withdrawn by way of outlet port 4. On the other hand, where an upflow is desired in column, the lower port 4 may serve as an inlet and the upper port 3 provides means for discharging a contacted stream from the chamber. One or more additional fluid streams that are to be mixed with the fluid passing vertically through the chamber will be introduced through one or more inlet lines 5 which in turn connect with the perforate distributor pipe means 6 within the interior of the chamber.

As best shown in the portion of FIGURE 1 that is in section, there is indicated the contact bed section 2 being supported and held in place by respectively a lower perforate support plate 7 and a cover plate means 8. The closely adjacent spaced plates 7 and 8 thus provide a small unpacked section in the chamber 1 to provide for the redistribution of the fluid stream moving vertically downwardly, or upwardly, through the column for contact with the particles in the packed beds and for mixing with the fluid mediums being introduced at one or more points by conduits 5 and the internal distributor pipe means. The perforate particle separating means 7 and 8 will, of course, have holes or slots or other perforate means sized in accordance with the size of the packing or subdivided particles that are used in beds 2 such that there is substantially no loss of particles from the beds. Where desired, wire screen or mesh may be used in combination with a grating or perforate plate to insure the retention of small subdivided particles in the packed zones. In addition, for large chambers, there may be suitable supporting ribs or beam sections in combination with the perforate plate means to hold the superimposed bed and resist the effect of pressure drops therethrough.

The distributing pipe means for the fluid to be added between packed sections may comprise one or more perforate pipe sections traversing such unpacked sections in a symmetrical manner so as to permit the substantially uniform lateral distribution of the intermediate added fluid stream across the entire cross sectional area of the column and to the inlet surface of a next adjacent packed bed section. A simple embodiment utilizes a single straight diametrically positioned pipe member with a closed end and with symmetrically placed fluid outlet holes. As best shown in FIGURE 2 of the drawing, an embodiment of the perforate distributor pipe section 6 of one diameter together with a downstream end portion of a reduced diameter, each with a plurality of holes 9 and 9' suitable to provide lateral jet streams of the additive fluid. The holes 9 and 9' are preferably provided substantially in two opposing rows whereby the fluid will be jetted outwardly in opposite directions and in jet-like streams along the surface of adjacent packed section 2. Where there is a downward liquid flow through the column, then the perforations 9 and 9' will be in the lower one-half portions of the distributing pipe means 6 and 10 such that the jet streams will pass outwardly over the perforate distributor plate 8 to mix with the downwardly moving liquid stream from the superposed packed section prior to entering the next lower contact zone.

In accordance with the present invention, horizontal baffle plate means, such as sections 11 and 11', are positioned on each side of the distributing pipe means 6 and 10 and in a plane substantially corresponding with the axis of the distributor pipe section such that all vertically moving liquid flow is necessarily channeled laterally to pass therearound. Thus, the baffle plate means 11 and 11' are non-perforate and are spaced a short distance away from the longitudinal edge portions of pipe sections 6 and 10, following the configuration thereof, to force all the vertical fluid flow to move laterally to the zone of the distributing pipe means and into the direct path of the jet streams of fluid being distributed by the opposing rows of outlet holes 9 and 9'. For a downward fluid flow through the contact beds, the holes 9 and 9' are spaced slightly below the horizontal center line of pipe sections 6 and 10 and on opposing side portions thereof such that the resulting jet streams issuing therefrom will pass laterally outwardly in opposing directions into the shallow space provided between the upper face of perforate plate means 8 and the lower face of non-perforate baffle means 11 and 11'. On the other hand, for an upward fluid flow through the column, the rows of holes 9 and 9' will be positioned slightly above the center line of pipe sections 6 and 10 whereby the jet streams of fluid will pass laterally outwardly above the top surfaces of non-perforate baffle means 11 and 11' into the shallow restricted space below the perforate plate 7 such that the intermixed combined fluid streams will pass upwardly in a mixed phase through the contact section 2.

It is not intended to limit the distributor pipe means 6 and 10 to the straight centrally positioned type of member shown, inasmuch as in optional arrangements there may be one or more lateral projecting branch lines from a central feed pipe section such as 6, or alternatively, there may be circular or semi-circular distributing pipe sections symmetrically positioned within the unpacked sections of the column to provide for a uniform distribution of liquid streams across the full cross-section of the column for admixture with the vertically flowing liquid material. In all cases, however, the non-perforate baffle means is positioned at a level substantially corresponding with the plane of the axis of the distributing pipe means and shall have cut out or slotted portions which follow the configuration of the distributor pipe arrangement whereby the vertically moving fluid material will be channeled over and along the side of each edge portion of the distributor pipe means to flow into the path of jet-like streams issuing from the distributor pipe means. In FIGURE 5 there is indicated diagrammatically a chamber having an unpacked section with a circular perforate fluid distributing pipe 30 having spaced holes 31 and 31' along, respectively, its inner and outer peripheries. Spaced concentrically inwardly from the distributor ring 30 is a non-perforate baffle plate 32 adapted to channel the vertical liquid flow through the chamber to the zone adjacent its inner wall and thence around the circular fluid distributor 30 by way of the open annular slot-like openings 33 and 33'. Thus, the fluid introduced by pipe means 30 is distributed uniformly into the downwardly, or upwardly, flowing fluid stream to then pass over and through the next adjacent packed section of the contacting column.

In order to provide an illustrative embodiment of the actual sizing of the fluid distributing system, such as may be used in connection with a chamber maintaining a plurality of sorptive beds to effect the sorption and separation of one fluid component in a mixed fluid phase, there may be used, for example, a two and one-half foot diameter column, of the type indicated in FIGURE 1 of the drawing, maintaining a plurality of superimposed beds of molecular sieves of the calcium-alumino silicate type (such as Linde Air Products Company 5–A sieves). The column may accommodate the flow of a hydrocarbon stream, such as fuel oil or diesel oil, at a flow rate of approximately 3430 gallons per hour in any one packed section whereby to effect the absorption and separation of the olefinic materials from the oil stream. The column will utilize the intermediate fluid distributing systems between the packed bed to alternate the distribution of the hydrocarbon stream as well as a flushing fluid and, in addition, to serve as treated fluid withdrawal means. The distributor pipe itself may comprise a length of 1-inch pipe size conduits extending diametrically across a half portion of the extractor in the manner of pipe section 6 of FIGURE 2 of the drawing. A second half section may comprise ¾-inch pipe size conduit extending diametrically the rest of the distance across the column, as in the manner of section 10 of FIGURE 2 of the drawing. Eighty ⅛-inch diameter holes are provided across the length of the pipe sections, being arranged in two rows slightly below the center line of the pipe, with 40 holes in each row, in the manner of holes 9 and 9' in FIGURES 1 and 2 of the drawing. Perforate plate sections holding the adjacent packed bed of molecular sieves are positioned to contact the upper and lower edges of the 1-inch pipe section such that there is approximately 1⅜ inch spacing in the unpacked zone. Thus, utilizing a quarter-inch steel plate for the non-perforate baffle means spaced from and extending each side of the perforate pipe sections, in the manner of plates 11 and 11' of the drawing, there will be approximately 9/16 inch clearance between the baffle plates and the adjacent upper and lower perforate plate sections for the packed portions of the chamber. In addition, the ¼ inch baffle plate means will be spaced each side of the perforate distributing pipe means to provide approximately ¼ inch gaps or slots along each longitudinal edge of the distributing pipe means. With the foregoing dimensions the liquid flowing downwardly through the column will be forced to pass by the distributor pipe means and the interior edges of the baffle plates at a velocity of approximately 1.5 feet per second and mix with the jet streams of fluid from the distributor pipe means as it passes laterally across the top of the next lower adjacent packed section. The high velocity precludes the backmixing of the downwardly moving liquid stream and the additive fluid in any portion of the space above the non-perforate baffle means. Also, with the shallow vertical spacings the maximum horizontal velocity in the lower horizontal downstream space will be of the order of 0.57 foot per second as it travels laterally across the top of the next bed for distribution therethrough.

The liquid being distributed through the ⅛-inch holes of the perforate pipe means may be of the order of approximately 13 feet per second, substantially above that of the main body of downwardly moving liquid whereby there is a jet-like effect of the distributed liquid into the narrow lateral distribution space. It is, of course, desirable that the ⅛-inch holes be placed substantially horizontally in the half section of the distributor pipe means such that they exit horizontally and have very little downward component in order to preclude direct impingement of the high pressure jet-stream on the top of the packed section.

Referring now specifically to FIGURE 3 of the drawing there is shown a column having subdivided packing material 13 which is held in place by suitable lower perforate plate means 1 and its adjacent wire screen or gauze 15, while perforate plate 16 with adjacent mesh or screen 17 confines the top portion thereof. The perforate plate members 14 and 16 are spaced apart sufficiently to provide for placement of perforate distributor pipe means 18 having opposing rows of holes 19 and 19'. For a downward fluid flow through the packed column, as indicated in the drawing, the holes 19 and 19' will be in the lower or downstream half portion of the distributor pipe means slightly below the interior edge of adjacent baffle means 20 and 20'. The holes shall in addition be drilled or otherwise formed through the pipe walls such that the jet-like streams will be ejected laterally in a manner precluding a direct downward flow against the next lower contact bed. In the present embodiment, special sloping baffle plate means 20 and 20' are positioned in the unpacked section of the column each side of the distributor pipe means, with inner extremities spaced substantially in the same plane as the axis of the pipe means 18. The baffles are also spaced a short distance from the latter to provide slots or passageway means 21 and 21' for the passage of the vertically flowing fluid medium in the column.

A particular advantage of the sloping baffle plate means 20 and 20' is found in the formation of an upper liquid collection section which increases in cross sectional area, and in volume, toward the zone of the distributor pipe 18 where the downwardly moving stream passes along the longitudinal edges of the pipe and into the path of the outwardly projecting feed streams of additive fluid into the column. Conversely, the space below the baffle plate means, where the mixed fluids are distributed across the upper surface of the next lower contact bed, there is formed a fluid distributing manifold section which decreases in area in the direction of flow. The large internal volume and cross sectional area at the zone of the distributor pipe and the small cross sectional area adjacent the wall of the packed column in turn effects a substantially uniform collection and distribution of fluid flow through the packed sections. Here again, the sizing of the perforate distributing pipe means and of the opposing rows of holes therein depend upon the quantity of liquid to be distributed intermediately into the column. The spacing of the internal edges of the baffle plate means 20 and 20' from the edges of the distributor pipe means 18, to form the slots and fluid passageway sections 21 and 21' will similarly depend upon the quantity of fluid to be accommodated vertically through the contacting column and the velocity to be maintained through the unpacked section so as to preclude back-mixing of the different fluid streams after they enter the downstream mixing and distributing section.

FIGURE 4 of the drawing indicates diagrammatically an upward fluid flow through superimposed packed sections 22 which are maintained in place by respectively upper and lower perforate plate means 23 and 24. The latter are in turn spaced sufficiently apart to provide a small unpacked section and for a distributor pipe means 25. The latter is provided with opposing rows of holes 26 and 26' which, in this instance, are within the upper half portion of the distributor pipe so as to be in a downstream zone and above the non-perforate baffle means 27 and 27'. As described in connection with prior embodiments, the baffle plate means 27 and 27' are positioned to form open or slotted zones 28 and 28' which follow the configuration of the distributor pipe means 25. Again the open passageway means 28 and 28' will channel the vertically flowing liquid around the distributor pipe means and directly into the jet streams of additive liquid from holes 26 and 26'.

Actually the rows of holes in the distributor pipe means may comprise two uniformly spaced rows as described in connection with prior embodiments, or alternatively, arrangements may be provided making more than two rows of holes on each side of the distributor pipe means. However, in all cases the positioning of the holes through the wall of the pipe means shall be substantially horizontal so as to preclude impingement or attrition against an adjacent packed section. The lateral substantially horizontal jet-like streams provide concurrent intermediate mixing with the flow of liquid outwardly through the shallow lateral distribution spaces between non-perforate baffle plate sections and the perforate plate means defining the face of the next downstream packed section.

It may also be pointed out in connection with a multiple bed fluid-solids contact unit that there may be processing operations, such as the continuous sorption process described in the aforementioned Patent No. 2,985,589, where the fluid distributing system also serves as a fluid collection system. Thus, the perforate distributor pipe means may actually for a portion of the time serve as a perforate collection means to withdraw liquid at an unpacked section between superimposed contacting zones. In such cases, the intermediate conduit 5 of FIGURE 1 will serve as a withdrawal conduit for a part of the processing operation, although at the same time a similar form of distributing system may be operating at a different level within the column as a fluid distributing means into the unpacked section between beds of the column. The fluid inlet and outlet points change positions and alternate in their functions throughout the process run.

I claim as my invention:

1. In a fluid-solids contacting chamber having spaced packed sections, the combination of perforate distributor pipe means extending laterally into the unpacked space between packed sections of the chamber, the perforations of said pipe means being positioned in a half portion thereof and in a substantially uniformly spaced opposing two-row arrangement having the perforations in substantially horizontal positions, whereby fluid distribution therefrom is jetted generally laterally in opposing directions, and substantially horizontal imperforate baffle means positioned in substantially the same horizontal plane as the axis of said pipe means and having slotted open portions to allow room for the latter, said slotted portions corresponding with the configuration of said pipe means and being sized to provide on each side thereof narrow fluid passageways along each of the longitudinal edges of said pipe means, whereby a fluid stream passing generally vertically through said contacting chamber will be channeled through the slotted portions of said baffle means along each side of said pipe means and into the paths of the fluid streams jetted from said pipe means.

2. The combination of claim 1 further characterized in that said horizontal baffle means comprises non-perforate plate sections spaced from and positioned each side of said perforate distributor pipe means at a level substantially equivalent to the horizontal axis of said distributor pipe means and the perforations of said distributor pipe means are positioned in and directed from the walls thereof in a downstream half portion permitting the ejection of jet streams laterally along a downstream face of said horizontal baffle means.

3. The combination of claim 1 further characterized in that said horizontal baffle means comprises non-perforate plate means having sloping upper and lower surfaces and an internal edge means spaced a short distance from the longitudinal edges of said perforate distributor pipe means along the plane of the axis thereof, the upper surface of said baffle means positioned and arranged to slope downwardly from an outer edge portion thereof to the inner edge portion at the zone of the distributor pipe means while the lower surface thereof conversely slopes upwardly from the outer edge portions to the inner edge portion at the zone of said distributor pipe means.

4. A multiple-bed packed chamber for effecting the improved mixing and contacting of at least two different fluid streams therein, which comprises, a vertically elongated confined chamber having at least one upper fluid port and one lower fluid port to provide for a generally vertical flow of a fluid stream therethrough, a plurality of spaced horizontally positioned perforate support members holding and retaining particulated contact material in a plurality of separate superimposed packed beds, said members and said contact material positioned to provide at least one shallow unpacked section between adjacent beds, perforate pipe means extending laterally into at least one unpacked section between vertically adjacent packed beds, said perforate pipe means connecting with a fluid supply port means for receiving a different fluid from outside of said packed chamber, said perforate pipe means also having closed inner end means and uniformly spaced substantially opposing rows of perforations in a one-half portion thereof and directed generally laterally therefrom to provide fluid distribution in jet-like streams in opposing directions across the surface of an adjacent packed bed, a substantially horizontal imperforate baffle means extending laterally in said unpacked section from the inner wall portion of said chamber in the plane of the axis of said perforate pipe means and providing respectively a fluid collecting zone along one face thereof and a fluid distributing zone along the other face thereof, slotted portions in said baffle means shaped to the configuration of said pipe means and sized slightly larger than said perforate pipe means on each side thereof providing a pair of generally parallel narrow fluid passageways extending contiguously along each of the opposite longitudinal sides of said pipe means, whereby said vertically flowing fluid is channeled through said narrow passageways along said distributor pipe means and into the path of the different fluid streams jetted substantially laterally from said pipe means along the surface of an adjacent packed bed and whereby a resulting mixed fluid stream enters such packed bed for contact therewith.

References Cited by the Examiner

UNITED STATES PATENTS

| | | | |
|---|---|---|---|
| 2,632,692 | 3/53 | Korin et al. | 23—288 |
| 2,697,881 | 12/54 | Kelley et al. | |
| 2,892,262 | 6/59 | Shirk | 23—288 X |

MORRIS O. WOLK, *Primary Examiner.*